US011789798B2

(12) United States Patent
Shrivastava et al.

(10) Patent No.: US 11,789,798 B2
(45) Date of Patent: Oct. 17, 2023

(54) METHOD AND SYSTEM FOR ENHANCING ORCHESTRATION AND AUTOMATING COMMUNICATION BETWEEN TEAMS DURING IT SYSTEMS TESTING

(71) Applicant: International Business Machines Corporation, Armonk, NY (US)

(72) Inventors: Shrey Shrivastava, White Plains, NY (US); Jeffrey Willoughby, Poughkeepsie, NY (US); Shuxin Lin, White Plains, NY (US); Yuanchen Hu, Wappingers Falls, NY (US); Dinesh C. Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 17/455,561

(22) Filed: Nov. 18, 2021

(65) Prior Publication Data

US 2023/0153188 A1    May 18, 2023

(51) Int. Cl.
*G06F 11/00* (2006.01)
*G06F 11/07* (2006.01)
*G06F 11/26* (2006.01)

(52) U.S. Cl.
CPC ...... *G06F 11/0769* (2013.01); *G06F 11/0721* (2013.01); *G06F 11/26* (2013.01)

(58) Field of Classification Search
CPC .. G06F 11/0769; G06F 11/0721; G06F 11/26; G06F 11/0709; G06F 11/079; G06F 11/0766; G06F 11/3006
See application file for complete search history.

(56) References Cited

U.S. PATENT DOCUMENTS

| 9,032,373 B1* | 5/2015 | Gupta ............... G06F 11/3688 717/127 |
| 10,452,508 B2 | 10/2019 | Maple et al. |
| 10,515,004 B2 | 12/2019 | Singi et al. |
| 10,528,456 B2 | 1/2020 | Shani et al. |
| 10,694,411 B2 | 6/2020 | Mueck et al. |
| 11,301,350 B1* | 4/2022 | Byrne ................. G06F 11/263 |

(Continued)

OTHER PUBLICATIONS

Boni Garcia et al. "A Proposal to Orchestrate Test Cases" [retrieved on Nov. 17, 2021].

(Continued)

*Primary Examiner* — Joseph D Manoskey
(74) *Attorney, Agent, or Firm* — Joseph C. Drish; Harrington & Smith (57) ABSTRACT

An apparatus includes circuitry configured to maintain a record of a plurality of owners and at least one test operation owned by an owner; prompt automatically the owner in response to a failure of the one test operation; maintain a log of actions taken on the one test operation, and provide availability to the log of actions; update an estimated time to completion, and notify a management entity of the updated estimated time to completion; mark and prioritize an order related to the one test operation, in response to the estimated time to completion being within a threshold of a delivery date; rank the marked order with other marked orders by a risk of not being able to meet the delivery date; and notify the owner of the ranking with an urgent message, in response to the marked order failing to meet the delivery date.

21 Claims, 7 Drawing Sheets

(56) References Cited

U.S. PATENT DOCUMENTS

| | | | |
|---|---|---|---|
| 2019/0327160 A1* | 10/2019 | Sivaprakasam | G06F 11/3672 |
| 2019/0384664 A1* | 12/2019 | Rondeau | G06F 11/0709 |
| 2020/0004668 A1 | 1/2020 | Dwivedi et al. | |
| 2020/0158780 A1 | 5/2020 | Ranganathan et al. | |
| 2020/0250074 A1 | 8/2020 | Zhang et al. | |
| 2020/0258102 A1 | 8/2020 | Bs et al. | |
| 2021/0243216 A1* | 8/2021 | Shivanna | H04L 63/1425 |
| 2021/0342337 A1* | 11/2021 | Lu | G06F 11/3006 |

OTHER PUBLICATIONS

Jose Pablo Escobedo et al. "Testing Web Service Orchestrators in Context: A Symbolic Approach" 2010 Software Engineering and Formal Methods. [retrieved on Nov. 17, 2021].

Cristian Augusto et al. "Retorch: Resource-Aware End-to-End Test Orchestration" Computer Science Department, University of Oviedo, Gijon. [retrieved on Nov. 17, 2021].

Lucas Leal et al. "Exploiting MDE for Platform-Independent Testing of Service Orchestrations" [retrieved on Nov. 17, 2021].

Sushant G. Gaikwad et al. "Pipeline Orchestration for Testing Automation Using Extended Buildbot Architecture" International Journal of Computer Applications. [retrieved on Nov. 17, 2021].

\* cited by examiner

FIG. 1

| | MFGN | ORNO | MDL | MATP | TYPE | PWRCFG | CELL | STATUS | OP | Title | PSSD | TCO | ETTC | NFW ETTC | Exceed (Hour) | Theoretical Exit Time | Projected Exit Time | Delta Projected VS Theoretical |
|---|---|---|---|---|---|---|---|---|---|---|---|---|---|---|---|---|---|---|
| 1 | 0T1EU3U | T1EU3U | T01 | 8561 | MES BOX | HV | 7W23 | Failed | 5032 | CTL LOW/HIGH BIAS MEMORY TESTS | 2020-07-13 | 75:42:42 | 13:10 | 13:09 | 63 | 2020-06-09 19:50:01 | 2020-06-09 20:49:30 | 0.98 |
| 2 | 0A2GCC0 | A2GCC0 | T01 | 8561 | BOX | LV | 052D01A | Held | 1366 | INTERIM INCIDENT MGMT REVIEW | 2020-07-13 | 171:40:40 | 25:46 | 25:45 | 54 | 2020-06-04 23:52:10 | 2020-06-09 13:25:30 | 109.55 |
| 3 | 0A2G1QL | A2G1QL | T01 | 8561 | BOX | LV | 052C08A | Running... | 1385 | CUSTOMIZE SHIP DRIVER | 2020-07-20 | 124:44:44 | 14:39 | 14:39 | 48 | 2020-06-06 22:47:55 | 2020-06-09 02:19:30 | 51.52 |
| 4 | 0CCTA01 | CCTA01 | T02 | 8562 | JMET | LV | 052BFL1 | Running... | 5030 | CTL NOMINAL I/O TEST | 2019-11-20 | 73:09:09 | 9:54 | | 47 | 2020-06-09 02:23:34 | 2020-06-08 21:34:30 | -4.82 |

200

202 Info about current mainframe being tested

204 Cell in which test is being conducted

206 Status of current test op

208 How long it has been in the cell?

210 Projected remaining time

212 Predicted exit times

METHOD AND SYSTEM FOR ENHANCING ORCHESTRATION AND AUTOMATING COMMUNICATION BETWEEN TEAMS DURING IT SYSTEMS TESTING

BACKGROUND

The exemplary embodiments described herein relate generally to system design, more specifically, to a method and system for enhancing orchestration and automating communication between teams during IT systems testing.

BRIEF SUMMARY

In one aspect, an apparatus includes at least one processor; and at least one non-transitory memory including computer program code; wherein the at least one memory and the computer program code are configured to, with the at least one processor, cause the apparatus at least to: maintain a record of a plurality of owners and at least one test operation owned by an owner of the plurality of owners; prompt automatically the owner in response to a failure of the at least one test operation owned by the owner; maintain a log of actions taken on the at least one test operation, the actions being recorded in the log as the actions occur, and provide availability to the log of actions; update an estimated time to completion, and notify a management entity of the updated estimated time to completion, in response to completion of the at least one test operation; mark and prioritize an order related to the at least one test operation, in response to the estimated time to completion being within a threshold of a delivery date; rank the marked order with other marked orders by a risk of not being able to meet the delivery date; and notify the owner of the ranking with an urgent message, in response to the marked order failing to meet the delivery date.

In another aspect, a method includes maintaining a record of a plurality of owners and at least one test operation owned by an owner of the plurality of owners; prompting automatically the owner in response to a failure of the at least one test operation owned by the owner; maintaining a log of actions taken on the at least one test operation, the actions being recorded in the log as the actions occur, and providing availability to the log of actions; updating an estimated time to completion, and notifying a management entity of the updated estimated time to completion, in response to completion of the at least one test operation; marking and prioritizing an order related to the at least one test operation, in response to the estimated time to completion being within a threshold of a delivery date; ranking the marked order with other marked orders by a risk of not being able to meet the delivery date; and notifying the owner of the ranking with an urgent message, in response to the marked order failing to meet the delivery date.

In another aspect, an orchestration system includes an execution status monitor configured to detect a status of at least one test operation; an ownership database that maintains a record of an owner of the at least one test operation; an interactive issue resolver configured to access a log of actions taken on the at least one test operation; and an issue manager configured to initiate an action with the interactive issue resolver in response to the status of the at least one test operation, and to provide to the interactive issue resolver information regarding the owner of the at least one test operation based on information from the ownership database; wherein the interactive issue resolver notifies the owner of the at least one test operation of the status of the at least one test operation with a real time dashboard; wherein the real time dashboard provides information related to the status of the at least one test operation to a plurality of groups responsible for an order being delivered, the order associated with the at least one test operation.

BRIEF DESCRIPTION OF THE SEVERAL VIEWS OF THE DRAWINGS

The foregoing and other aspects of exemplary embodiments are made more evident in the following Detailed Description, when read in conjunction with the attached Drawing Figures, wherein.

DETAILED DESCRIPTION

The term "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Described herein is a method and system for enhancing orchestration and automating communication between teams in mainframe manufacturing. The orchestration system has a record of which individuals own each test op and automatically prompts them when their ops fail. The system marks who is using a test cell currently. In the system, a detailed log of all actions taken on the test cell is recorded as they happen and made available. When an op finishes, an estimated time to completion (ETTC) is updated and management is notified. When an ETTC falls within a threshold of the required ship date the order is marked and prioritized. The order is also ranked with other marked orders by risk of missing the ship date. When a marked order fails the owners are notified of the ranking and to solve the issue urgently.

The orchestration system as described herein automatically prompts the right person about the problem, and provides a real-time update about progress. The herein described orchestration system further prioritizes the testing jobs based on the 'Estimated Time for Completion' (ETTC) metric. The orchestration system manages communication in a testing environment with multiple teams.

As described herein, the orchestration system provides a way to handle failure of script language tests, and enhances and automates the communication for improving ETTC. The herein described system provides orchestration of completing processes to eliminate idle time.

As used herein, a test cell refers to a testing job for a machine manufactured from a single customer specification. As used herein, test ops refer to, in each test cell, there are many test operations (test ops) running based on the mainframe specification.

In mainframe manufacturing testing, the main goal is to finish the fulfillment tests and send the manufactured machine to shipping and delivery. The time remaining from any point in the process until shipping is referred to as Estimated Time to Completion (ETTC). There are two cases identifies when the ETTC gets delayed: 1) when a test operation fails, the test cell becomes idle until the engineer addresses the issue and restarts the test operation. This process is manual currently and can lead to delays of several hours in the ETTC; and 2) when a test cell completes, it is sitting idle for several hours waiting for a new mainframe test to begin.

There are several 'pain points' (e.g. recurring problems) in mainframe manufacturing. First, figuring out which systems are in jeopardy of missing their ship date is a manual process, which often results in missing the deadline. The role of the engineering/support (ES) team and the manufacturing/operations (MO) team is to communicate with the management/business (MB) team about delays in delivery. Manufacturing operations and engineering support both need test cells to do their jobs. Thus, one of the issues is that communication between teams on what is being done on a system is all by word of mouth. In addition, some actions being taken on a test cell are invisible to others allowing for teams to 'step on each other's toes', or do by one team an action that another team is responsible for doing. Further, all the relevant information on the status of a test cell is in very different places. The examples described herein provide a solution for the aforementioned recurring issues.

Figure 1:
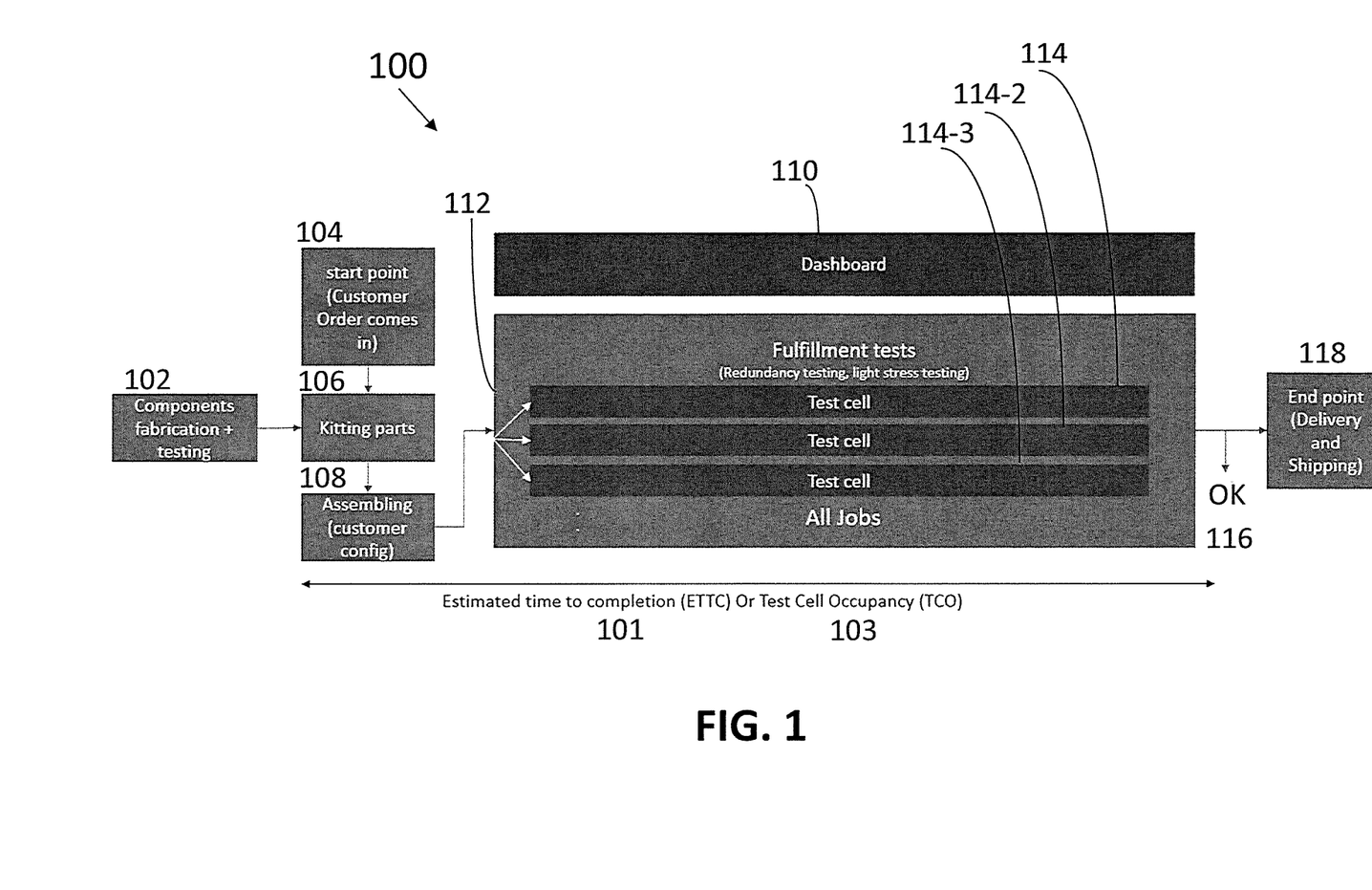
FIG. 1 is a block diagram depicting estimated time to completion (ETTC) or test cell occupancy (TCO)

FIG. 1 is a block diagram 100 depicting estimated time to completion (ETTC) 101 or test cell occupancy (TCO) 103. Test cell occupancy 103 includes the time for a test cell (114, 114-2, 114-3) to complete fulfillment tests 112. Fulfillment tests 112 include redundancy testing and light stress testing. The fulfillment tests 112 include a test cell for all jobs, and there is one or more test cells (such as 114, 114-2, 114-3) for each job. The ETTC 101 includes the test cell occupancy 103 as well as the time for the start point 104, the time for kitting parts 106, and the time for assembling 108. The start point 104 includes the time for a customer order to come in. The assembling 108 may be based on a customer configuration.

As further shown in FIG. 1, the start point 104, the kitting parts 106, and the assembling 108 may be done in parallel or at least with some overlap in duration. Prior to each of start point 104, kitting parts 106, and assembling 108, during item 102 components for the machine are fabricated and tested. Upon successful completion of the fulfillment tests 112, a machine is marked as 'OK' 116, and then the machine at 118 is delivered and shipped, which delivery and shipment is the end point of the process. The dashboard 110 provides information about the fulfillment tests 112.

Figure 2:
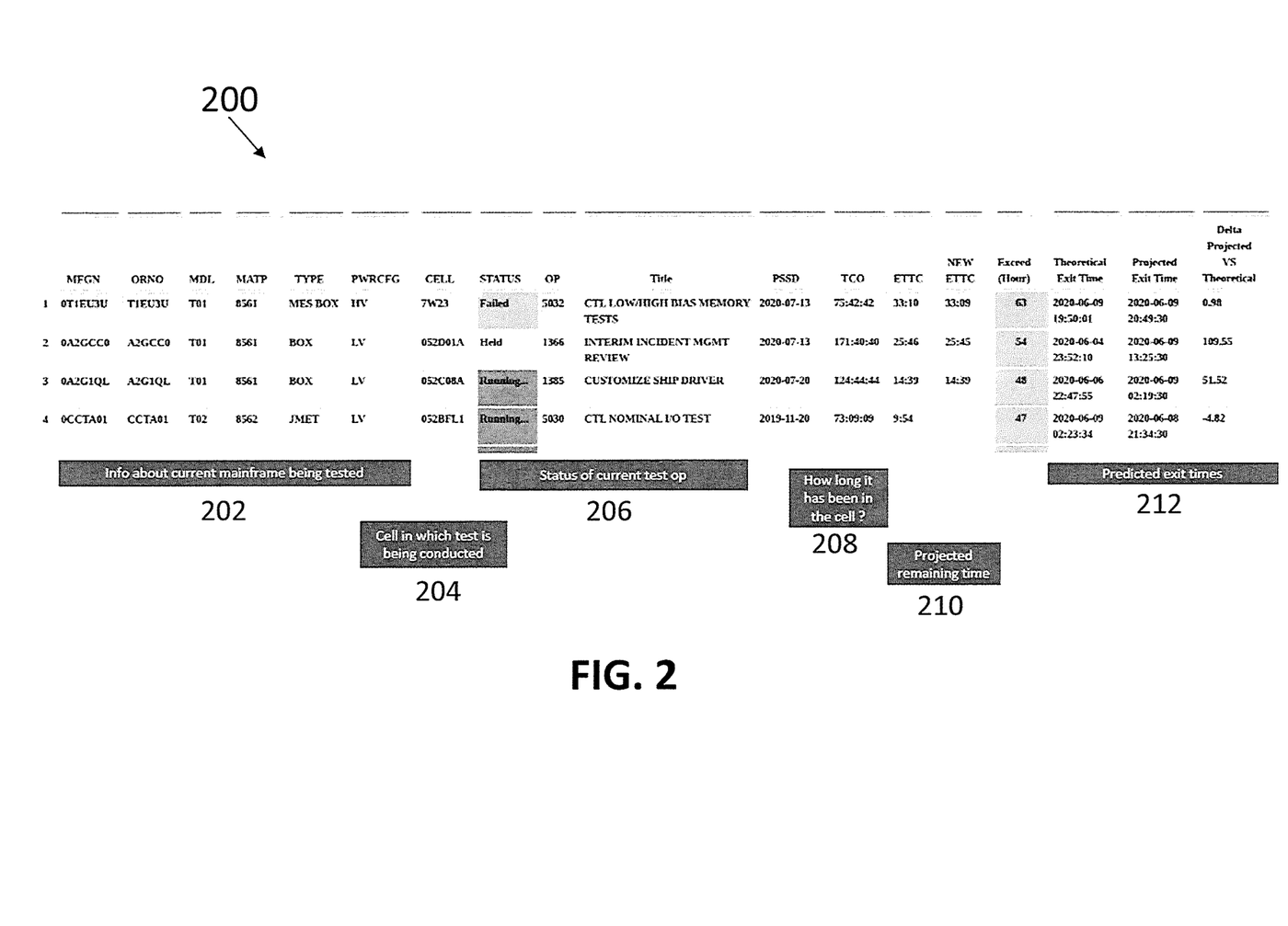
FIG. 2 illustrates a current dashboard for mainframe manufacturing.

FIG. 2 illustrates a current dashboard 200 for mainframe manufacturing. As shown in FIG. 2, the current dashboard 200 includes information about the current mainframe being tested (202), the cell in which the test is being conducted (204), the status of the current test op (206), the length of time the test op has been in the cell (208), the projected remaining time (210), and the predicted exit times (212).

There are several issues that need to be addressed by a test manufacturing system design. When a cell fails, the next action is to determine who owns the problem and notify them. Currently, test technicians and management notify the right engineering team or person who can solve the problem. If the test cell has failed, items that are to be determined include whether someone is working on the issue, and if so, what their report of the problem is, and whether the testing has restarted. However, the current dashboards merely show a binary pass/fail. An improvement over current dashboards is therefore to provide greater detail about the failure like e.g. temperature, etc. Another helpful feature would be to automatically show a progress bar for all the test cells, such as how many test cells passed and how many test cells failed, which would resolve the issue of lack of transparency. Another helpful feature would be to communicate any changes in the new ETTC to management, which would also resolve the issue of lack of transparency in a manufacturing test system.

Figure 3:
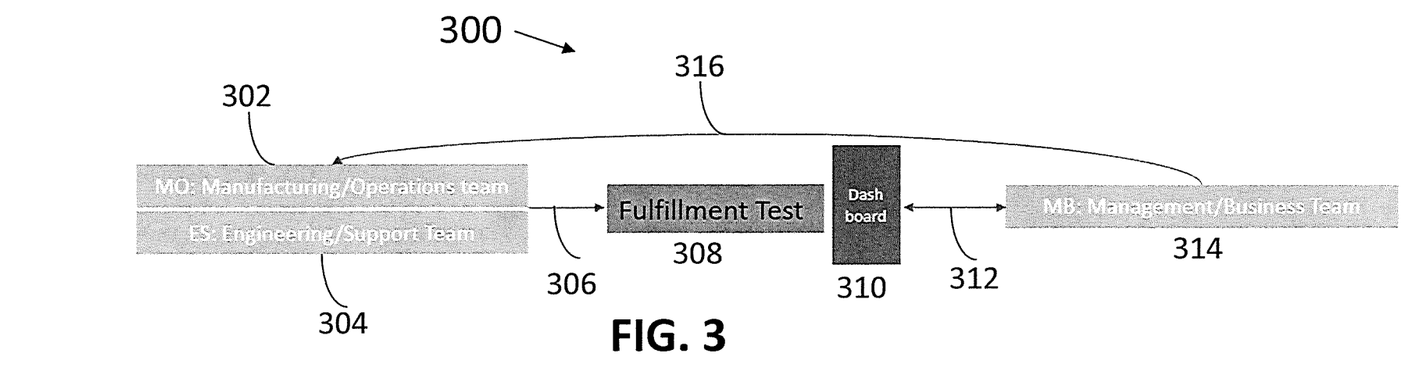
FIG. 3 is block diagram of a current system for mainframe manufacturing.

FIG. 3 is block diagram of a current system 300 for mainframe manufacturing. As shown in FIG. 3, the manufacturing/operations team (MO) 302 and the engineering/support team (ES) 304 generate a fulfillment test 308 (e.g. one or more fulfillment tests 308). The generation of the fulfillment test 308 by the MO team 302 and the ES team 304 is shown by unidirectional interface 306. The dashboard 310 maintains tracking of the fulfillment test 308. The dashboard 310 is accessed by and provides information to the management/business team (MB) 314 via bidirectional interface 312. Based on information provided by the dashboard 310, the MB team 314 provides information about the fulfillment test 308 to the MO team 302 and the ES team 304 via unidirectional interface 316.

Figure 4:
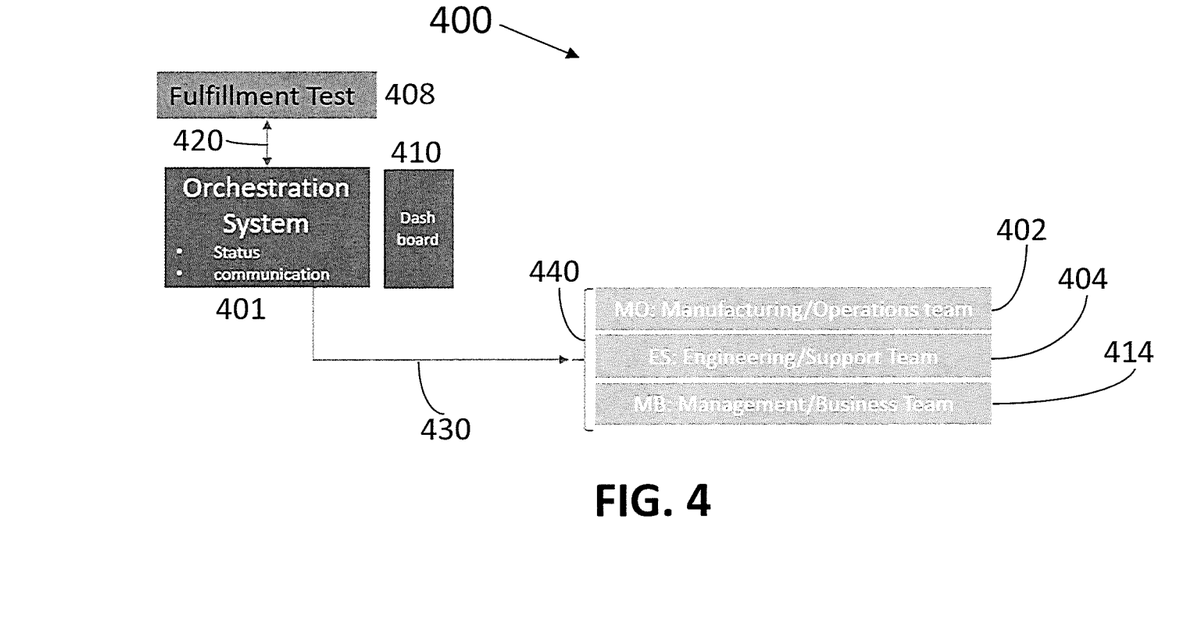
FIG. 4 is a block diagram of the solution described herein for mainframe manufacturing.

FIG. 4 is a block diagram of a system 400 described herein that provides a solution for mainframe manufacturing. The solution depicted in FIG. 4 is in contrast to that shown in FIG. 3. As shown in FIG. 4, two interfaces (420, 430) are implemented, rather than three interfaces (306, 312, 316), and information is available to each of the three groups (collectively 440) at a common time, where the collective 440 comprises the MO team 402, the ES team 404, and the MB team 414. The orchestration system 401 absent from FIG. 3 provides core functionality for providing information between the three groups of teams (402, 404, 414).

As further shown in FIG. 4, the orchestration system 401 provides information regarding the fulfillment test 408 (e.g. one or more fulfillment tests 408), including status and other communication, and receives information regarding the fulfillment test 408 via the bidirectional interface 420. The orchestration system 401 provides information to the dashboard 410. The orchestration system 401 also provides information, via the interface 430 which may include information from the dashboard 410, regarding the fulfillment test(s) 408 and the dashboard 410 to each of the MO team 402, the ES team 404, and the MB team 414 (collective 440).

The orchestration system 401 has a record of which individuals own each test op and automatically prompts them when their ops fail. The orchestration system 401 marks who is using a test cell currently. In the orchestration system 401, a detailed log of all actions taken on the test cell (114, 114-2, 114-3) is recorded as they happen and made available. When an op finishes, an estimated time to completion (ETTC) is updated and management 414 is notified. When an ETTC falls within a threshold of the required ship date the order is marked and prioritized. The order is also ranked with other marked orders by risk of missing ship date. When a marked order fails the owners (402, 404) are notified of the ranking and to solve the issue urgently.

Figure 5A:
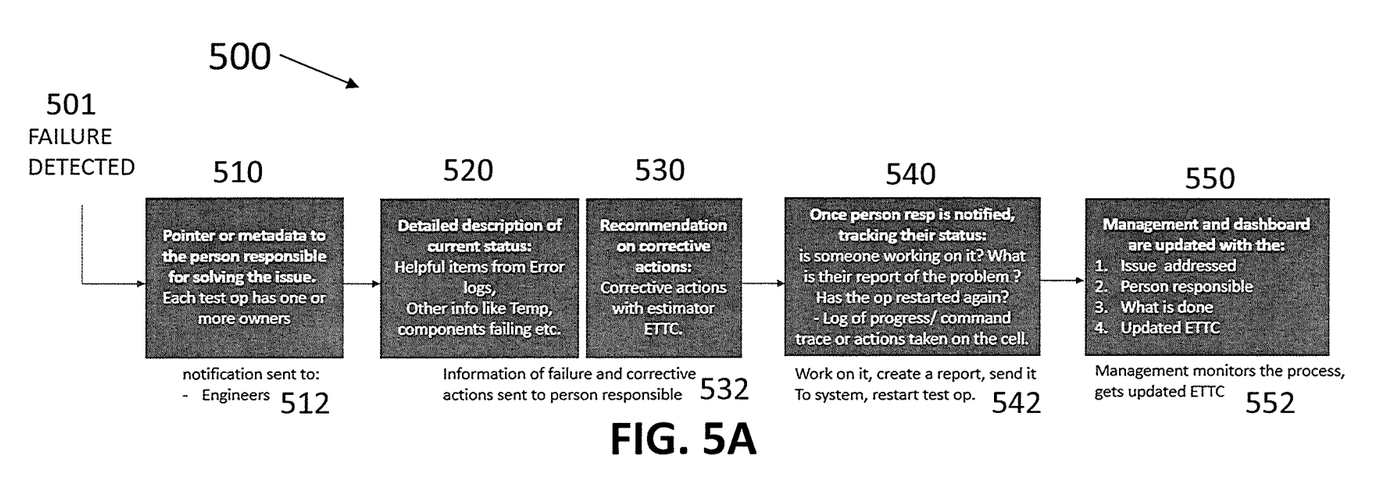
FIG. 5A is a flowchart of a process in an orchestration system.

FIG. 5A is a flowchart 500 of a process in an orchestration system (e.g. 401). A failure is detected at 501. Following detection of the failure at 501, at 510 the orchestration system 401 provides a pointer or metadata to the person responsible (e.g. 402, 404) for solving the issue. Each test op has one or more owners (402, 404). At 512 (based on at least 510), a notification is sent to the engineers (402, 404). At 520, the orchestration system 401 provides a detailed description of the current status. The detailed description may include helpful items from error logs, other information like temperature, components failing, etc. At 530, the orchestration system 401 provides a recommendation on corrective actions with an estimated ETTC. At 532 (based on a least 520 and 530), information of failure and corrective actions are sent to the person responsible (e.g. 402, 404).

At 540, once the responsible person is notified, a status is tracked by the orchestration system 401. The status tracked by the orchestration system 401 may include information such as whether someone is working on the issue, a person's report of the problem, whether the op has restarted again, a progress log, and/or a command trace or actions taken on the cell. At 542 (based on at least 540), the person responsible works on the issue, creates a report, and sends the report to the orchestration system 401, and restarts the test op. At 550, the orchestration system 401 updates management (414) and the dashboard 410 with 1) the issue addressed, 2) the person responsible, 3) what is done, and 4) an updated ETTC. At 552 (based on at least 550), management (414) monitors the process, and receives an updated ETTC.

Figure 5B:
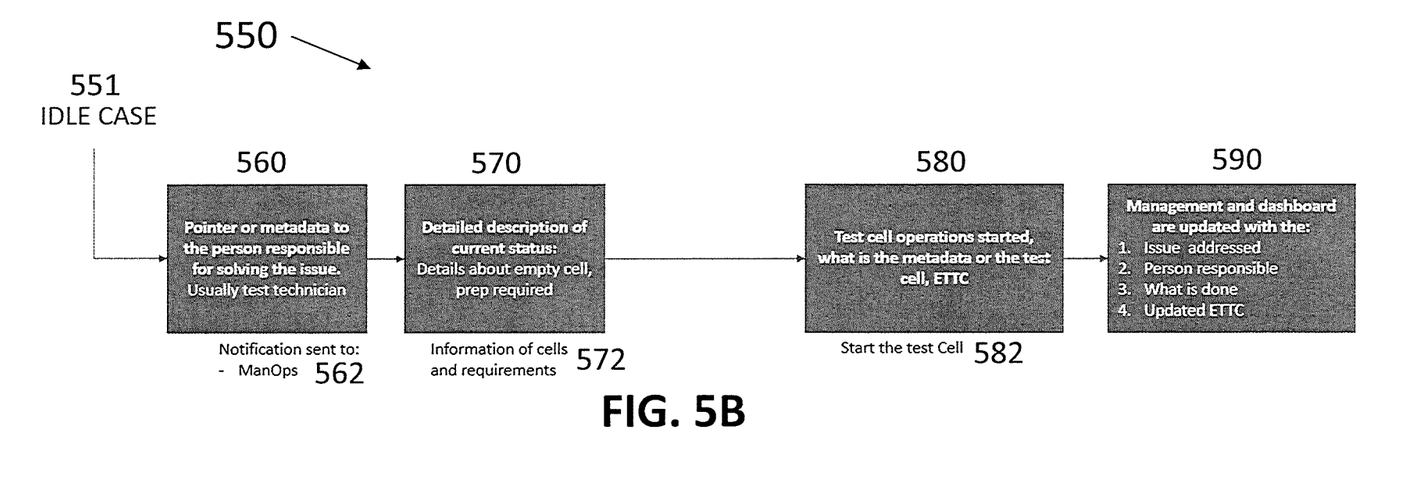
FIG. 5B is a flowchart of another process in an orchestration system.

FIG. 5B is a flowchart 550 of another process in an orchestration system (e.g. 401). At 551, the orchestration system 401 is in an idle case state. At 560, the orchestration system 401 provides a pointer or metadata to the person responsible (402, 404) for solving the issue. At 560, the person responsible for solving the issue is usually a test technician. At 562 (based on at least 560), the orchestration system 401 sends a notification to the manufacturing and operations team 402 (ManOps). At 570, the orchestration system 401 provides a detailed description of the current status. The detailed description provided at 570 includes details about the empty cell, and preparation required. At 572 (based on at least 570), the orchestration system 401 provides information of cells and requirements. At 580, when test cell operations have started, the orchestration system 401 provides the metadata or the test cell, and/or the ETTC. At 582 (based on at least 580), the test cell is started. At 590, the orchestration system 401 updates management 414 and the dashboard 410 with 1) the issue addressed, 2) the person responsible, 3) what is done, and 4) and updated ETTC.

Figure 6:
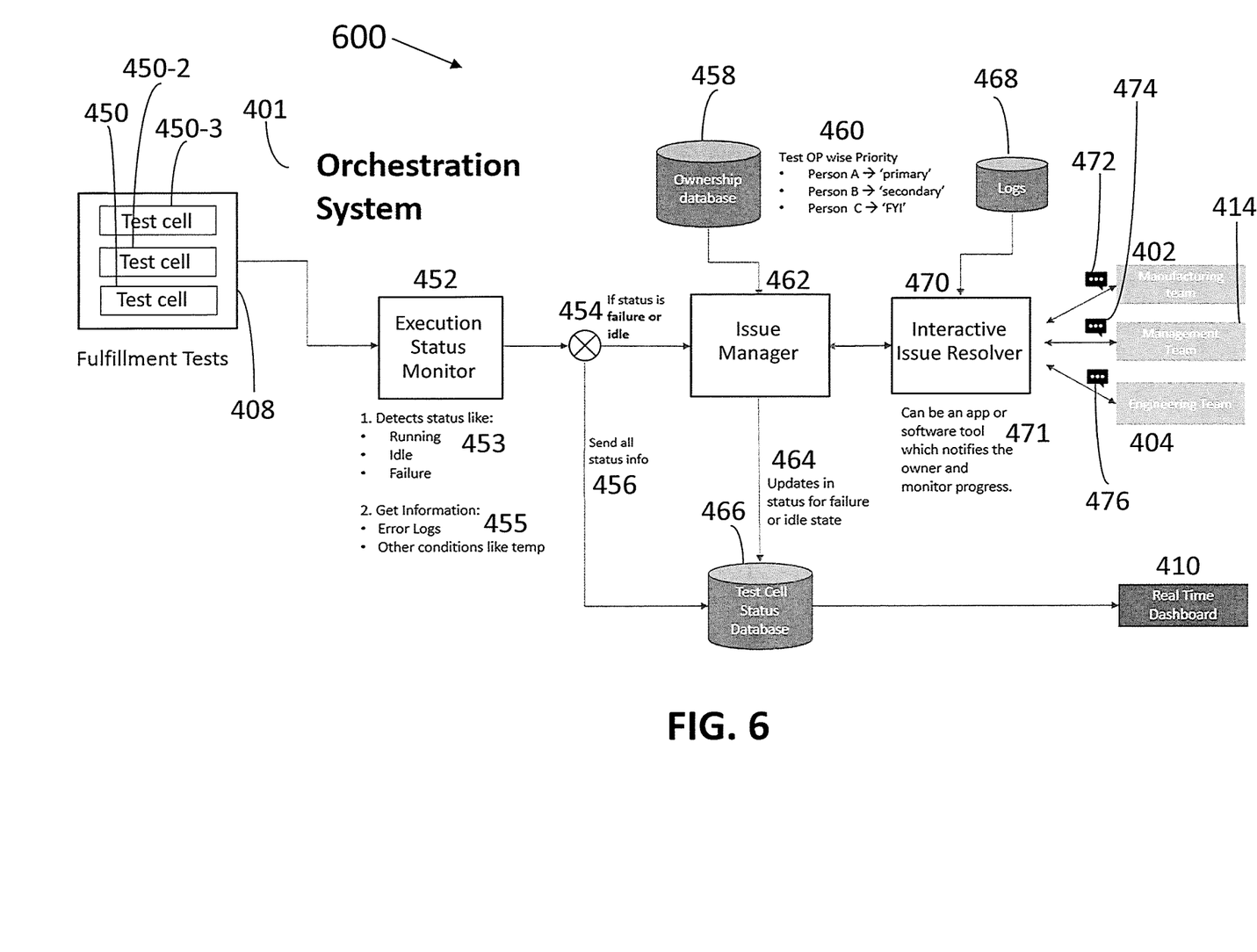
FIG. 6 is a system diagram of the orchestration system as described herein.

FIG. 6 is a system diagram 600 of the orchestration system 401 as described herein. As shown in FIG. 6, the orchestration system 401 includes an execution status monitor 452, which receives and obtains information regarding fulfillment tests 408. The fulfillment tests 408 include at least test cell 450, test cell 450-2, and test cell 450-3. Fulfillment tests 408 may include other test cells not shown. The execution status monitor 452 detects status (453) of the fulfillment tests 408, such as whether the test cells (450, 450-2, 450-3) are running, idle, or have failed. The execution status monitor 452 further obtains information (455) such as from error logs, where the information can be conditions such as temperature.

At 454, the orchestration system 401 determines whether the status is failure or idle. At 456, the status information is sent to the test cell status database 466 of the orchestration system 401. As shown in FIG. 6, the orchestration system 401 includes an issue manager 462. The issue manager receives information regarding whether the status is failure or idle (determination at 454). The issue manager 462 has access to ownership database 458, such that the issue manager 462 may query (update, delete, or insert information into) the ownership database 458. As shown at 460, the ownership database maintains information about the owners of the various fulfillment tests 408, including Test OP wise priority. For example, Person A may be stored as a primary owner, Person B may be stored as a secondary owner, and Person C stored as 'for your information (FYI)'.

The issue manager 462, at 464, provides updates regarding the status of the fulfillment tests 408, including for a failure or idle state, to the test cell status database 466. Thus, the issue manager 462 may query (update, delete, or insert information into) the test cell status database 466. The test cell status database 466 provides test cell status information to the real time dashboard 410. The orchestration system 401 further includes an interactive issue resolver 470. The issue manager 462 provides information to and receives information from the interactive issue resolver 470. The interactive issue resolver 470 has access to a logs database 468 of the orchestration system 401, which logs database 468 may contain error logs or other information about the fulfillment tests 408.

As indicated at 471, the interactive issue resolver 470 can be an app or software tool which notifies the owner of the fulfillment tests 408, including the test cells (450, 450-2, 450-3) and monitors progress of the fulfillment tests 408, including the test cells (450, 450-2, 450-3). Accordingly, the interactive issue resolver 470 notifies with notification 472 the manufacturing team 402 of status or any issue, notifies with notification 474 the management team 414 of status or any issue, and notifies with notification 476 the engineering team 404 of status or any issue.

There are several technical effects of the examples described herein. The described orchestration system allows any type of time sensitive test process to operate more efficiently. The examples described herein further provide value for mainframe manufacturing, as the orchestration system allows hours of wasted time in the test process to be reclaimed and allows more systems to ship on time. During the end of quarter, the revenue impact is on the order of millions of USD.

Figure 7:
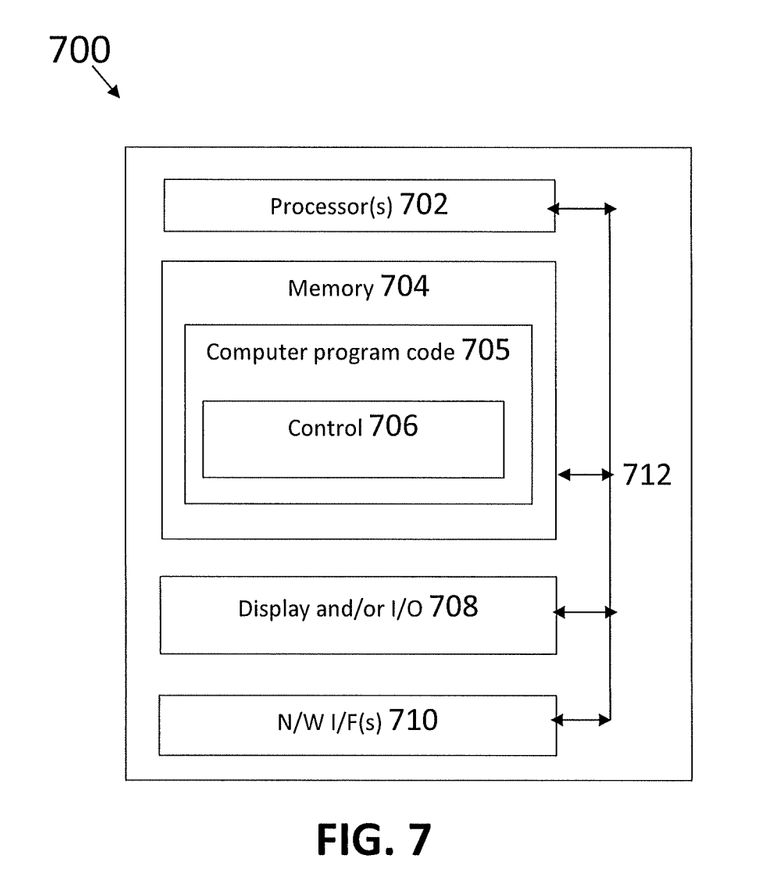
FIG. 7 is an example apparatus configured to implement the examples described herein.

FIG. 7 is an example apparatus 700, which may be implemented in hardware, configured to implement the examples described herein. The apparatus 700 comprises at least one processor 702 (e.g. FPGA, CPU, ASIC, GPU), at least one memory 704 including computer program code 705, wherein at least one memory 704 and the computer program code 705 are configured to, with the at least one processor 702, cause the apparatus 700 to implement circuitry, a process, component, module, or function (collectively control 706) to implement the examples described herein, including a method and system for enhancing orchestration and automating communication between teams during IT systems testing. The memory 704 may be a non-transitory memory, a transitory memory, a volatile memory, or a non-volatile memory.

The apparatus 700 includes a display and/or I/O interface 708 that may be used to display aspects or a status of the methods described herein (e.g., as one of the methods is being performed or at a subsequent time), or to receive input from a user such as with using a keypad. The apparatus 700 includes one or more network (N/W) interfaces (I/F(s)) 710.

The N/W I/F(s) 710 may be wired and/or wireless and communicate over the Internet/other network(s) via any communication technique. The N/W I/F(s) 710 may comprise one or more transmitters and one or more receivers. The N/W I/F(s) 710 may comprise standard well-known components such as an amplifier, filter, frequency-converter, (de)modulator, and encoder/decoder circuitries and one or more antennas.

The apparatus 700 to implement the functionality of control 706 may be the orchestration system 401 or the dashboard 410. Apparatus 700 may be part of a self-organizing/optimizing network (SON) node, such as in a cloud. Apparatus 700 may correspond to any of the apparatuses shown in the other figures. The apparatus 700 may also be distributed throughout a network including within and between apparatus 700 and any network element (such as a network control element (NCE) and/or a radio access network node and/or a user equipment). The apparatus 700 may be virtualized or subject to virtualization.

Interface 712 enables data communication between the various items of apparatus 700, as shown in FIG. 7. For example, the interface 712 may be one or more buses such as address, data, or control buses, and may include any interconnection mechanism, such as a series of lines on a motherboard or integrated circuit, fiber optics or other optical communication equipment, and the like. Computer program code 705, including control 706 may comprise object-oriented software configured to pass data/messages between objects within computer program code 705. The apparatus 700 need not comprise each of the features mentioned, or may comprise other features as well.

Figure 8:
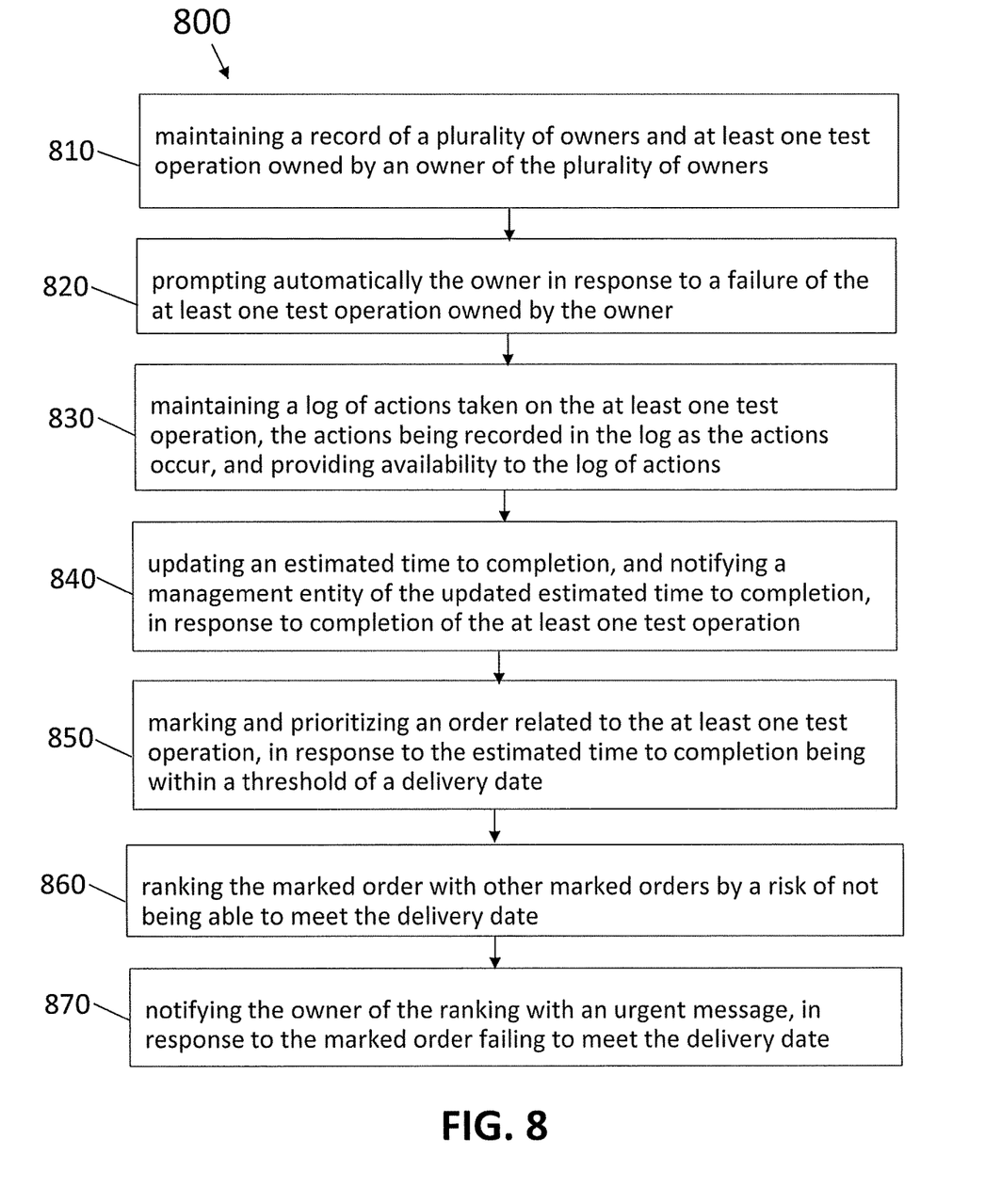
FIG. 8 is a logic flow diagram that illustrates the operation of a method, based on the examples described herein.

The various blocks of method 800 shown in FIG. 8 may be viewed as method steps, and/or as operations that result from operation of computer program code, and/or as a plurality of coupled logic circuit elements constructed to carry out the associated function(s). The blocks of method 800 may be performed with different devices, such as with different computer program code implemented with the different devices.

At 810, the method includes maintaining a record of a plurality of owners and at least one test operation owned by an owner of the plurality of owners. At 820, the method includes prompting automatically the owner in response to a failure of the at least one test operation owned by the owner. At 830, the method includes maintaining a log of actions taken on the at least one test operation, the actions being recorded in the log as the actions occur, and providing availability to the log of actions. At 840, the method includes updating an estimated time to completion, and notifying a management entity of the updated estimated time to completion, in response to completion of the at least one test operation. At 850, the method includes marking and prioritizing an order related to the at least one test operation, in response to the estimated time to completion being within a threshold of a delivery date. At 860, the method includes ranking the marked order with other marked orders by a risk of not being able to meet the delivery date. At 870, the method includes notifying the owner of the ranking with an urgent message, in response to the marked order failing to meet the delivery date. Method 800 may be performed with orchestration system 401, real time dashboard 410, or with apparatus 700.

Referring now to all the Figures, in one exemplary embodiment, an apparatus includes at least one processor; and at least one non-transitory memory including computer program code; wherein the at least one memory and the computer program code are configured to, with the at least one processor, cause the apparatus at least to: maintain a record of a plurality of owners and at least one test operation owned by an owner of the plurality of owners; prompt automatically the owner in response to a failure of the at least one test operation owned by the owner; maintain a log of actions taken on the at least one test operation, the actions being recorded in the log as the actions occur, and provide availability to the log of actions; update an estimated time to completion, and notify a management entity of the updated estimated time to completion, in response to completion of the at least one test operation; mark and prioritize an order related to the at least one test operation, in response to the estimated time to completion being within a threshold of a delivery date; rank the marked order with other marked orders by a risk of not being able to meet the delivery date; and notify the owner of the ranking with an urgent message, in response to the marked order failing to meet the delivery date.

The apparatus may further include wherein the at least one memory and the computer program code are further configured to, with the at least one processor, cause the apparatus at least to: detect a status of the at least one test operation; and provide access to the status of the at least one test operation to a real time dashboard; wherein the status of the at least one test operation comprises at least one of idle, failure, or complete. The apparatus may further include wherein the at least one memory and the computer program code are further configured to, with the at least one processor, cause the apparatus at least to: provide information within a real time dashboard, the information within the real time dashboard comprising: a type of the failure of the at least one test operation, the owner of the at least one test operation, at least one action taken in response to the failure of the at least one test operation, and the updated estimated time to completion. The apparatus may further include wherein the at least one memory and the computer program code are further configured to, with the at least one processor, cause the apparatus at least to: provide information related to a status of the at least one test operation to a plurality of groups responsible for the order being delivered. The apparatus may further include wherein the at least one memory and the computer program code are further configured to, with the at least one processor, cause the apparatus at least to: provide information to the owner related to a reason for the failure of the at least one test operation. The apparatus may further include wherein the at least one memory and the computer program code are further configured to, with the at least one processor, cause the apparatus at least to: provide at least one corrective action to the owner, in response to the failure of the at least one test operation owned by the owner. The apparatus may further include wherein the at least one memory and the computer program code are further configured to, with the at least one processor, cause the apparatus at least to: track a status of the failure of the at least one test operation. The apparatus may further include wherein the at least one memory and the computer program code are further configured to, with the at least one processor, cause the apparatus at least to: determine whether the owner or other entity is attempting to resolve the failure of the at least one test operation; and obtain a report from the owner related to the failure of the at least one test operation. The apparatus may further include wherein the at least one memory and the computer program code are further configured to, with the at least one processor, cause the apparatus at least to: determine whether the at least one test operation has restarted following the failure of the at least one test operation; and trace progress of the at least one test operation following the failure of the at least one test operation.

In another exemplary embodiment, a method includes maintaining a record of a plurality of owners and at least one test operation owned by an owner of the plurality of owners; prompting automatically the owner in response to a failure of the at least one test operation owned by the owner; maintaining a log of actions taken on the at least one test operation, the actions being recorded in the log as the actions occur, and providing availability to the log of actions; updating an estimated time to completion, and notifying a management entity of the updated estimated time to completion, in response to completion of the at least one test operation; marking and prioritizing an order related to the at least one test operation, in response to the estimated time to completion being within a threshold of a delivery date; ranking the marked order with other marked orders by a risk of not being able to meet the delivery date; and notifying the owner of the ranking with an urgent message, in response to the marked order failing to meet the delivery date.

The method may further include detecting a status of the at least one test operation; and providing access to the status of the at least one test operation to a real time dashboard; wherein the status of the at least one test operation comprises at least one of idle, failure, or complete. The method may further include providing information within a real time dashboard, the information within the real time dashboard comprising: a type of the failure of the at least one test operation, the owner of the at least one test operation, at least one action taken in response to the failure of the at least one test operation, and the updated estimated time to completion. The method may further include providing information related to a status of the at least one test operation to a plurality of groups responsible for the order being delivered. The method may further include providing information to the owner related to a reason for the failure of the at least one test operation. The method may further include providing at least one corrective action to the owner, in response to the failure of the at least one test operation owned by the owner. The method may further include tracking a status of the failure of the at least one test operation. The method may further include determining whether the owner or other entity is attempting to resolve the failure of the at least one test operation; and obtaining a report from the owner related to the failure of the at least one test operation. The method may further include determining whether the at least one test operation has restarted following the failure of the at least one test operation; and tracing progress of the at least one test operation following the failure of the at least one test operation.

In another exemplary embodiment, an orchestration system includes an execution status monitor configured to detect a status of at least one test operation; an ownership database that maintains a record of an owner of the at least one test operation; an interactive issue resolver configured to access a log of actions taken on the at least one test operation; and an issue manager configured to initiate an action with the interactive issue resolver in response to the status of the at least one test operation, and to provide to the interactive issue resolver information regarding the owner of the at least one test operation based on information from the ownership database; wherein the interactive issue resolver notifies the owner of the at least one test operation of the status of the at least one test operation with a real time dashboard; wherein the real time dashboard provides information related to the status of the at least one test operation to a plurality of groups responsible for an order being delivered, the order associated with the at least one test operation.

The orchestration system may further include a test operation status database, wherein the test operation status database receives information related to the status of the at least one test operation from the execution status monitor, and wherein the test operation status database provides access to the status of the at least one test operation to the real time dashboard.

References to a 'computer', 'processor', etc. should be understood to encompass not only computers having different architectures such as single/multi-processor architectures and sequential or parallel architectures but also specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memory(ies) as described herein may be implemented using any suitable data storage technology, such as semiconductor based memory devices, flash memory, magnetic memory devices and systems, optical memory devices and systems, non-transitory memory, transitory memory, fixed memory and removable memory. The memory(ies) may comprise a database for storing data.

As used herein, circuitry may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor (s) or a portion of a microprocessor(s), that require software or firmware for operation, even if the software or firmware is not physically present. As a further example, as used herein, circuitry would also cover an implementation of merely a processor (or multiple processors) or a portion of a processor and its (or their) accompanying software and/or firmware. Circuitry would also cover, for example and if applicable to the particular element, a baseband integrated circuit or applications processor integrated circuit for a mobile phone or a similar integrated circuit in a server, a cellular network device, or another network device.

LIST OF ABBREVIATIONS

ASIC application-specific integrated circuit
CPU central processing unit
ES engineering/support team
ETTC estimated time to completion or estimated time for completion
FPGA field-programmable gate array
GPU graphics processing unit
I/F interface
IT information technology
MB management/business team
MO manufacturing/operations team
NCE network control element
N/W network
op operation SON self-organizing/optimizing network node
TCO test cell occupancy In the foregoing description, numerous specific details are set forth, such as particular structures, components, materials, dimensions, processing steps, and techniques, in order to provide a thorough understanding of the exemplary embodiments disclosed herein. However, it will be appreciated by one of ordinary skill of the art that the exemplary embodiments disclosed herein may be practiced without these specific details. Additionally, details of well-known structures or processing steps may have been omitted or may have not been described in order to avoid obscuring the presented embodiments.

The description of the present invention has been presented for purposes of illustration and description, but is not intended to be exhaustive or limiting in the form disclosed. Many modifications and variations will be apparent to those of ordinary skill in the art without departing from the scope of the invention. The embodiments were chosen and described in order to best explain the principles of the invention and the practical applications, and to enable others of ordinary skill in the art to understand the invention for various embodiments with various modifications as are suited to the particular uses contemplated.

What is claimed is:

1. An apparatus comprising:
   at least one processor; and
   at least one non-transitory memory including computer program code;
   wherein the at least one memory and the computer program code are configured to, with the at least one processor, cause the apparatus at least to:
   maintain a record of a plurality of owners and at least one test operation owned by an owner of the plurality of owners;
   prompt automatically the owner in response to a failure of the at least one test operation owned by the owner;
   maintain a log of actions taken on the at least one test operation, the actions being recorded in the log as the actions occur, and provide availability to the log of actions;
   update an estimated time to completion of an order, and notify a management entity of the updated estimated time to completion of the order, in response to completion of the at least one test operation;
   mark and prioritize the order related to the at least one test operation, in response to the estimated time to completion of the order being within a threshold of a delivery date associated with the order;
   rank the marked order with at least one other marked order by a risk of not being able to meet a respective delivery date of a respective marked order, the respective delivery date comprising the delivery date and the respective marked order comprising the marked order; and
   notify the owner of the ranking with an urgent message, in response to the marked order failing to meet the delivery date.

2. The apparatus of claim 1, wherein the at least one memory and the computer program code are further configured to, with the at least one processor, cause the apparatus at least to:
   detect a status of the at least one test operation; and
   provide access to the status of the at least one test operation with a real time dashboard;
   wherein the status of the at least one test operation comprises at least one of idle, failure, or complete.

3. The apparatus of claim 1, wherein the at least one memory and the computer program code are further configured to, with the at least one processor, cause the apparatus at least to:
   provide information within a real time dashboard, the information within the real time dashboard comprising: a type of the failure of the at least one test operation, the owner of the at least one test operation, at least one action taken in response to the failure of the at least one test operation, and the updated estimated time to completion.

4. The apparatus of claim 1, wherein the at least one memory and the computer program code are further configured to, with the at least one processor, cause the apparatus at least to:
   provide information related to a status of the at least one test operation to a plurality of groups responsible for the order being delivered, the plurality of groups comprising a manufacturing or operations group, an engineering or support group, and a management or business group.

5. The apparatus of claim 1, wherein the at least one memory and the computer program code are further configured to, with the at least one processor, cause the apparatus at least to:
   provide information to the owner related to a reason for the failure of the at least one test operation.

6. The apparatus of claim 1, wherein the at least one memory and the computer program code are further configured to, with the at least one processor, cause the apparatus at least to:
   provide at least one corrective action to the owner, in response to the failure of the at least one test operation owned by the owner.

7. The apparatus of claim 1, wherein the at least one memory and the computer program code are further configured to, with the at least one processor, cause the apparatus at least to:
   track a status of the failure of the at least one test operation.

8. The apparatus of claim 1, wherein the at least one memory and the computer program code are further configured to, with the at least one processor, cause the apparatus at least to:
   determine whether the owner or other entity is attempting to resolve the failure of the at least one test operation; and
   obtain a report from the owner related to the failure of the at least one test operation.

9. The apparatus of claim 1, wherein the at least one memory and the computer program code are further configured to, with the at least one processor, cause the apparatus at least to:
   determine whether the at least one test operation has restarted following the failure of the at least one test operation; and
   trace progress of the at least one test operation following the failure of the at least one test operation.

10. A method comprising:
    maintaining a record of a plurality of owners and at least one test operation owned by an owner of the plurality of owners;
    prompting automatically the owner in response to a failure of the at least one test operation owned by the owner;

maintaining a log of actions taken on the at least one test operation, the actions being recorded in the log as the actions occur, and providing availability to the log of actions;

updating an estimated time to completion of an order, and notifying a management entity of the updated estimated time to completion of the order, in response to completion of the at least one test operation;

marking and prioritizing the order related to the at least one test operation, in response to the estimated time to completion of the order being within a threshold of a delivery date associated with the order;

ranking the marked order with at least one other marked order by a risk of not being able to meet a respective delivery date of a respective marked order, the respective delivery date comprising the delivery date and the respective marked order comprising the marked order; and notifying the owner of the ranking with an urgent message, in response to the marked order failing to meet the delivery date.

11. The method of claim 10, further comprising:
detecting a status of the at least one test operation; and
providing access to the status of the at least one test operation with a real time dashboard;
wherein the status of the at least one test operation comprises at least one of idle, failure, or complete.

12. The method of claim 10, further comprising providing information within a real time dashboard, the information within the real time dashboard comprising: a type of the failure of the at least one test operation, the owner of the at least one test operation, at least one action taken in response to the failure of the at least one test operation, and the updated estimated time to completion.

13. The method of claim 10, further comprising providing information related to a status of the at least one test operation to a plurality of groups responsible for the order being delivered, the plurality of groups comprising a manufacturing or operations group, an engineering or support group, and a management or business group.

14. The method of claim 10, further comprising providing information to the owner related to a reason for the failure of the at least one test operation.

15. The method of claim 10, further comprising providing at least one corrective action to the owner, in response to the failure of the at least one test operation owned by the owner.

16. The method of claim 10, further comprising tracking a status of the failure of the at least one test operation.

17. The method of claim 10, further comprising:
determining whether the owner or other entity is attempting to resolve the failure of the at least one test operation; and
obtaining a report from the owner related to the failure of the at least one test operation.

18. The method of claim 10, further comprising:
determining whether the at least one test operation has restarted following the failure of the at least one test operation; and
tracing progress of the at least one test operation following the failure of the at least one test operation.

19. An orchestration system, comprising:
at least one processor; and
at least one non-transitory memory storing instructions that, when executed by the at least one processor, cause the orchestration system at least to:
detect, with an execution status monitor, a status of at least one test operation;
maintain, with an ownership database, a record of an owner of the at least one test operation;
access, with an interactive issue resolver, a log of actions taken on the at least one test operation; and
initiate, with an issue manager, an action with the interactive issue resolver based on the status of the at least one test operation, and provide, with the issue manager to the interactive issue resolver, information regarding the owner of the at least one test operation based on information from the ownership database;
notify, with the interactive issue resolver, the owner of the at least one test operation of the status of the at least one test operation with a real time dashboard;
provide, with the real time dashboard, information related to the status of the at least one test operation to a plurality of groups responsible for an order being delivered, the order associated with the at least one test operation, the plurality of groups comprising a manufacturing or operations group, an engineering or support group, and a management or business group.

20. The orchestration system of claim 19, wherein the instructions, when executed by the at least one processor, cause the orchestration system at least to:
receive, with a test operation status database, information related to the status of the at least one test operation from the execution status monitor; and
provide, with the test operation status database, the status of the at least one test operation to a real time dashboard.

21. An orchestration system, comprising:
at least one processor; and
at least one non-transitory memory storing instructions that, when executed by the at least one processor, cause the orchestration system at least to:
detect, with an execution status monitor, a status of at least one test operation;
maintain, with an ownership database, a record of an owner of the at least one test operation;
access, with an interactive issue resolver, a log of actions taken on the at least one test operation; and
initiate, with an issue manager, an action with the interactive issue resolver based on the status of the at least one test operation, and provide, with the issue manager to the interactive issue resolver, information regarding the owner of the at least one test operation based on information from the ownership database;
notify, with the interactive issue resolver, the owner of the at least one test operation of the status of the at least one test operation with a real time dashboard;
provide, with the real time dashboard, information related to the status of the at least one test operation to a plurality of groups responsible for an order being delivered, the order associated with the at least one test operation.

* * * * *